(12) United States Patent
Green et al.

(10) Patent No.: US 10,711,210 B2
(45) Date of Patent: Jul. 14, 2020

(54) METHOD OF PREPARING METAL DIBORIDE DISPERSIONS AND FILMS

(71) Applicant: Arizona Board of Regents on Behalf of Arizona State University, Scottsdale, AZ (US)

(72) Inventors: Alexander Green, Scottsdale, AZ (US); Ahmed Yousaf, Tempe, AZ (US); Abhishek Debnath, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 236 days.

(21) Appl. No.: 15/775,735

(22) PCT Filed: Nov. 11, 2016

(86) PCT No.: PCT/US2016/061594
§ 371 (c)(1),
(2) Date: May 11, 2018

(87) PCT Pub. No.: WO2017/083693
PCT Pub. Date: May 18, 2017

(65) Prior Publication Data
US 2018/0354806 A1    Dec. 13, 2018

Related U.S. Application Data

(60) Provisional application No. 62/254,632, filed on Nov. 12, 2015.

(51) Int. Cl.
*C10L 3/10*  (2006.01)
*C08K 3/38*  (2006.01)
(Continued)

(52) U.S. Cl.
CPC ............ *C10L 3/105* (2013.01); *B01D 53/047* (2013.01); *B01D 53/266* (2013.01); *C01B 35/04* (2013.01);
(Continued)

(58) Field of Classification Search
CPC .... C01B 35/04; C10L 3/105; C10L 2290/542; C10L 2290/30; C10L 2290/08;
(Continued)

(56) References Cited

U.S. PATENT DOCUMENTS 6,797,341 B2    9/2004  Zeng et al.
10,155,782 B2   12/2018  Wang
(Continued)

FOREIGN PATENT DOCUMENTS

WO    2017083693 A1    5/2017

OTHER PUBLICATIONS

Korean Intellectual Property Office; PCT International Search Report, Issued in Connection to PCT/US2016/061594; dated Feb. 15, 2017; 4 pages; Korea.
(Continued)

*Primary Examiner* — Angela C Scott
(74) *Attorney, Agent, or Firm* — Quarles & Brady LLP; Jessica L. Lewis

(57) ABSTRACT

Some embodiments include a method of producing metal diboride nanomaterials having thickness down to the atomic scale and lateral areas from 10 nm to over 1 μm by preparing a mixture of a metal diboride and a suspending solution. The suspending solution can be an organic solvent or a solution containing water, and optionally can include a dispersion agent, such as a surfactant, a polymer, small molecule, or biopolymer. Further, the method includes exfoliating the metal diboride by exposing the mixture to ultrasonic energy, centrifuging the mixture forming supernatant that includes a
(Continued)

dispersion of exfoliated metal diborides, and extracting the dispersion from the supernatant. Some embodiments include extracting the supernatant and casting the solution by diluting the dispersion with a second suspending solution that includes dissolved polymer. This can result in a composite film includes a dispersion of the exfoliated metal diborides and provides improved mechanical properties.

4 Claims, 9 Drawing Sheets

(51) Int. Cl.
    *C08J 3/21*    (2006.01)
    *C08L 29/04*    (2006.01)
    *C01B 35/04*    (2006.01)
    *C08J 3/215*    (2006.01)
    *C08J 5/18*    (2006.01)
    *B01D 53/047*    (2006.01)
    *B01D 53/26*    (2006.01)
    *B82Y 30/00*    (2011.01)
    *B82Y 40/00*    (2011.01)

(52) U.S. Cl.
    CPC .............. *C08J 3/212* (2013.01); *C08J 3/215* (2013.01); *C08J 5/18* (2013.01); *C08K 3/38* (2013.01); *C08L 29/04* (2013.01); *C10L 3/106* (2013.01); *B01D 2253/116* (2013.01); *B01D 2256/245* (2013.01); *B01D 2257/504* (2013.01); *B01D 2257/55* (2013.01); *B01D 2257/708* (2013.01); *B82Y 30/00* (2013.01); *B82Y 40/00* (2013.01); *C01P 2002/77* (2013.01); *C01P 2002/80* (2013.01); *C01P 2004/04* (2013.01); *C01P 2004/24* (2013.01); *C08J 2327/18* (2013.01); *C08J 2329/04* (2013.01); *C08K 2201/011* (2013.01); *C10L 2290/06* (2013.01); *C10L 2290/08* (2013.01); *C10L 2290/30* (2013.01); *C10L 2290/542* (2013.01); *C10L 2290/547* (2013.01)

(58) Field of Classification Search
    CPC ........... C10L 2290/06; C10L 2290/547; C10L 3/106; C08J 3/212; C08J 5/18; C08J 3/215; C08J 2329/04; C08J 2327/18; C08K 3/38; C08K 2201/011; B01D 53/266; B01D 53/047; B01D 2257/708; B01D 2257/55; B01D 2257/504; B01D 2256/245; B01D 2253/116; C08L 29/04; B82Y 40/00; B82Y 30/00; C01P 2002/77; C01P 2004/24; C01P 2004/04; C01P 2002/80
    USPC ........................................................ 524/404
    See application file for complete search history.

(56) References Cited

U.S. PATENT DOCUMENTS

| | | |
|---|---|---|
| 2003/0021991 A1 | 1/2003 | Sugayoshi et al. |
| 2015/0014033 A1 | 1/2015 | Park et al. |
| 2019/0144305 A1 | 5/2019 | Wang |

OTHER PUBLICATIONS

Korean Intellectual Property Office; PCT Written Opinion of the International Searching Authority, Issued in Connection to PCT/US2016/061594; dated Feb. 15, 2017; 7 pages; Korea.

Das, Saroj Kumar et al.; Aqueous Dispersions of Few-Layer-Thick Chemically Modified Magnesium Diboride Nanosheets by Ultrasonication Assisted Exfoliation; Scientific Reports; Jun. 4, 2015; vol. 5, Article No. 10522; Internal pp. 1-11.
Carenco, Sophie et al.; Nanoscaled Metal Borides and Phosphides: Recent Developments and Perspectives; Chemical Reviews; 2013; vol. 113, No. 10; pp. 7981-8065.
Tang, Hui et al.; Self-Doping in Boron Sheets from First Principles: A Route to Structural Design of Metal Boride Nanostructures; Physical Review B; 2009, vol. 80, No. 13, Article No. 134113; internal pp. 1-8.
Acerce, M., et al., M. Metallic 1T phase MoS2 nanosheets as supercapacitor electrode materials. Nat. Nanotechnol. 10, 313-8 (2015).
Bae, S., et al. "Roll-to-roll production of 30-inch graphene films for transparent electrodes." Nature nanotechnology 5.8 (2010): 574.
Bolotin, K. I., et al. "Ultrahigh electron mobility in suspended graphene." Solid State Communications 146.9-10 (2008): 351-355.
Boustani, I., et al. "New boron based nanostructured materials." The Journal of chemical physics 110.6 (1999): 3176-3185.
Buzea, C. et al. Review of the superconducting properties of MgB 2. Supercond. Sci. Technol. 14, R115 (2001).
Ciuparu, D., et al. "Synthesis of pure boron single-wall nanotubes." The Journal of Physical Chemistry B 108.13 (2004): 3967-3969.
Coleman, J. N. et al. Two-Dimensional Nanosheets Produced by Liquid Exfoliation of Layered Materials. Science (80-. ). 331, 568-571 (2011).
Dean, Cory R., et al. "Boron nitride substrates for high-quality graphene electronics." Nature nanotechnology 5.10 (2010): 722.
Fahrenholtz, W. G., et al. "Refractory diborides of zirconium and hafnium." Journal of the American Ceramic Society 90.5 (2007): 1347-1364.
Feng, B. et al. Experimental Realization of Two-Dimensional Boron Sheets. Nat. Chem. 8, 563-568 (2016).
Garvie, L. A. J., et al. Parallel electron energy-loss spectroscopy (PEELS) study of B in minerals: the electron energy-loss near-edge structure (ELNES) of the B K edge. Am. Mineral. 80, 1132-1144 (1995).
Geim, A. K., et al. "The rise of graphene." Nature Materials 6 (2007): 183-191.
Gu, Q., et al. Transition metal borides: Superhard versus ultra-incompressible. Adv. Mater. 20, 3620-3626 (2008).
Gupta, N., et al. "Ballistic studies on TiB2—Ti functionally graded armor ceramics." Defence Science Journal 62.6 (2012): 382-389.
Jayaraman, S., et al. "HfB2 and Hf—B—N hard coatings by chemical vapor deposition." Surface and Coatings Technology 200.22-23 (2006): 6629-6633.
Kang, W. N., et al. "MgB2 superconducting thin films with a transition temperature of 39 Kelvin." Science 292.5521 (2001): 1521-1523.
Khan, U. et al. Polymer reinforcement using liquid-exfoliated boron nitride nanosheets. Nanoscale 5, 581-7 (2013).
Khan, U., et al. "Solvent-exfoliated graphene at extremely high concentration." Langmuir 27.15 (2011): 9077-9082.
Lau KC, et al. Stability and electronic properties of atomistically-engineered 2D boron sheets. The Journal of Physical Chemistry C. Feb. 22, 2007;111(7):2906-12.
Lau, K.C., et al. "First-principles study of the stability and electronic properties of sheets and nanotubes of elemental boron." Chemical Physics Letters 418.4-6 (2006): 549-554.
Lee, C., et al. "Measurement of the elastic properties and intrinsic strength of monolayer graphene." science 321.5887 (2008): 385-388.
Li, Qi, et al. "Flexible high-temperature dielectric materials from polymer nanocomposites." Nature 523.7562 (2015): 576.
Li, W.-L., et al. "The B35 cluster with a double-hexagonal vacancy: a new and more flexible structural motif for borophene." Journal of the American Chemical Society 136.35 (2014): 12257-12260.
Lim, C. S., et al. Layered titanium diboride: towards exfoliation and electrochemical applications. Nanoscale 7, 12527-12534 (2015).
Lotya, M., et al. High-concentration, surfactant-stabilized graphene dispersions. ACS Nano 4, 3155-3162 (2010).

(56) References Cited

OTHER PUBLICATIONS

Mannix, A. J. et al. Synthesis of borophenes: Anisotropic two-dimensional polymorphs. Science. 350, 1513-1516 (2015).

May, P., et al. Approaching the theoretical limit for reinforcing polymers with graphene. J. Mater. Chem. 22, 1278 (2012).

McLeod, A. D., et al. "Electrical resistivities of monocrystalline and polycrystalline TiB2." Journal of the American Ceramic Society 67.11 (1984): 705-708.

Mudgel, M., et al. "Superconductivity of various borides: The role of stretched c-parameter." Journal of Applied Physics 105.7 (2009): 07E313.

Munro, R. G. "Material properties of titanium diboride." Journal of Research of the National Institute of Standards and Technology 105.5 (2000): 709.

Murthy, TSR Ch, et al. "A new TiB2+ CrSi2 composite—Densification, characterization and oxidation studies." International Journal of Refractory Metals and Hard Materials 28.4 (2010): 529-540.

Murthy, TSR Ch, et al. "Densification, characterization and oxidation studies of TiB2—WSi2 composite." International Journal of Refractory Metals and Hard Materials 33 (2012): 10-21.

Novoselov, K. S., et al. "Electric field effect in atomically thin carbon films." science 306.5696 (2004): 666-669.

O'Neill, A., et al. Preparation of high concentration dispersions of exfoliated MoS 2 with increased flake size. Chem. Mater. 24, 2414-2421 (2012).

Opila, E., et al. "Oxidation of ZrB 2-and I-IfB 2-based ultra-high temperature ceramics: effect of Ta additions." Journal of Materials Science 39.19 (2004): 5969-5977.

Piazza, Z. A., et al. "Planar hexagonal B 36 as a potential basis for extended single-atom layer boron sheets." Nature communications 5 (2014): 3113.

Pospischil, A., et al. "CMOS-compatible graphene photodetector covering all optical communication bands." Nature Photonics 7.11 (2013): 892.

Radisavljevic, B., et al. Single-layer MoS2 transistors. Nat. Nanotechnol. 6, 147-50 (2011).

Rodriguez, S., et al. "Microstructural characterization of TiB 2 armor targets." Journal of materials science letters 21.21 (2002): 1661-1666.

Wang, Q. H., et al. "Electronics and optoelectronics of two-dimensional transition metal dichalcogenides." Nature nanotechnology 7.11 (2012): 699.

Wu, Y., et al. "High-frequency, scaled graphene transistors on diamond-like carbon." Nature 472.7341 (2011): 74.

Zeng, X., et al. "In situ epitaxial MgB 2 thin films for superconducting electronics." Nature materials 1.1 (2002).

Zhai, H.-J., et al. "Hydrocarbon analogues of boron clusters—planarity, aromaticity and antiaromaticity." Nature materials 2.12 (2003): 827.

Zhai, H.-J., et al. "Observation of an all-boron fullerene." Nature chemistry 6.8 (2014): 727.

Zhu, Y., et al. "Carbon-based supercapacitors produced by activation of graphene." science 332.6037 (2011): 1537-1541.

METHOD OF PREPARING METAL DIBORIDE DISPERSIONS AND FILMS

RELATED APPLICATIONS

This application claims the benefit, and priority benefit, of International Patent Application No. PCT/US2016/061594, filed Nov. 11, 2016, which designated the United States and was entitled "METHOD OF PREPARING METAL DIBORIDE DISPERSIONS AND FILMS," which claims the benefit and priority benefit of U.S. Provisional Patent Application Ser. No. 62/254,623, filed Nov. 12, 2015 the disclosure and contents of which are incorporated by reference herein in their entirety.

STATEMENT REGARDING FEDERALLY SPONSORED RESEARCH OR DEVELOPMENT

Some research conducted for conception and development of at least one embodiment of the invention described herein was made using Federal funds awarded by the National Science Foundation under Grant No. DMR-CER-1610153. The U.S. Federal Government has certain rights in the invention.

BACKGROUND

The first electrical measurements of atomically thin layers of graphene initiated a flurry of research activity to explore and exploit the superlative properties of two-dimensional nanomaterials. Graphene, the archetypal 2d material, can provide electronic mobilities in excess of 200,000 $cm^2\ V^{-1}\ s^{-1}$, and exhibits the highest strength of any known material. These properties and others have been harnessed in a range of different applications, including supercapacitors, transparent conductors, wideband photodetectors, and RF electronics. Despite these developments, the applications of graphene have been fundamentally limited by zero-bandgap semiconducting or semi-metal behavior, which prevents its incorporation into conventional field-effect transistor devices. Researchers have thus turned to other elements in the periodic table to unearth new 2d materials with beneficial new properties. Transition metal dichalcogenides such as $MoS_2$, $MoSe_2$, and $WS_2$, are 2d semiconductors that provide direct bandgaps and strong spin-orbit effects, making them promising materials for optoelectronic and spintronic devices. Boron nitride (an electrical insulator with unusually high thermal conductivity) has been used as a high-performance gate dielectric for electronic devices, and in flexible, high-temperature dielectric nanocomposites.

Despite considerable research activity focused on similar layered materials, the metal diborides remain a largely unexplored class of potential 2d nanomaterials. These compounds have the general formula $MB_2$, where M is metal such as Mg, Al, or Ti. They consist of layers of boron arranged in a honeycomb lattice that are separated by metal atoms centered atop each boron hexagon. Their structure is thus similar to that of intercalated graphite. Although the metal diborides share the same structure, they possess a diverse range of materials properties. $MgB_2$ is a well-known superconductor with a 39K transition temperature, which ranks it among the highest of the conventional superconductors. $AlB_2$ and boron-enriched $NbB_{2+x}$ are also superconducting. Transition metal diborides, such as $ZrB_2$, $HfB_2$, and $TiB_2$, are highly refractory with melting temperatures above 3000° C., and provide high mechanical hardness, strong resistance to chemical attack and erosion, and high electrical conductivities. These ultrahigh temperature ceramics ("UHTCs") are ideal materials for use in extreme conditions, such as in coatings for cutting tools, high temperature electrodes, and components for hypersonic flight and atmospheric reentry vehicles. $TiB_2$, in particular, also possesses low density and low Poisson's ratio for use in armor and exhibits electrical conductivity up to $1.6\times10^7$ S $m^{-1}$ (at 20° C.), which is higher than that of elemental Ti and within a factor of four of copper. Due to their extremely high melting temperatures, efficient means of sintering the transition metal diborides remains a key challenge preventing their more widespread adoption.

The metal diborides, with their graphene-like boron sheets, are also related to boron nanostructures garnering increasing research interest. Boron allotropes have long been viewed as potential companion compounds to the well-known carbon nanoscale allotropes buckminsterfullerene ($C_{60}$), carbon nanotubes, and graphene. Like carbon, boron is well known for its ability to form covalent bonds with diverse elements and form molecular networks. Accordingly, there have been many attempts to form boron equivalents of the archetypal carbon nanomaterials. Theoretical treatments have predicted that these boron compounds could provide novel electronic properties and in some cases, electrical conductivity that exceeds that of carbon nanotubes. Unfortunately, it has remained challenging to synthesize boron nanostructures since they have proved to be less thermodynamically stable than more common allotropes. Researchers have been making steady progress synthesizing all boron nanostructures, including clusters, single-walled boron nanotubes, and most recently borosphorene ($B_{40}$), the boron equivalent of $C_{60}$. Synthesis of the borophene, the boron equivalent of graphene, remains an outstanding challenge in materials science and chemistry. Moreover, dispersing metal diborides also remains a challenge. Current techniques to disperse these compounds have required ion intercalation (see for example T. T. Salguero, C. A. Barrett & D. Sexton. Nanoparticles And Method Of Making Nanoparticles. 20150140331 (2015)), or hydroxylation (see for example S. K. Das, A. Bedar, A. Kalman & K. Jasuja, "Aqueous dispersions of few-layer-thick chemically modified magnesium diboride nanosheets by ultrasonication assisted exfoliation," Scientific Reports 5 (2015).). These techniques tend to produce suspensions that yield compounds with starkly different chemical properties from pristine metal diborides.

SUMMARY

Some embodiments include a method of producing metal diboride nanomaterials comprising preparing a mixture of at least one metal diboride and a first suspending solution, where the first suspending solution comprises at least one dissolved polymer at a first concentration. Further, the method can include at least partially exfoliating the at least one metal diboride by exposing the mixture to ultrasonic energy comprising ultrasonic vibrations. Further, the method includes centrifuging the mixture and forming at least a lower phase and an adjacent supernatant, where the supernatant includes a dispersion of exfoliated metal diborides. Further, the method can include extracting at least a portion of the dispersion from the supernatant, and forming a casting solution by diluting the dispersion with a second suspending solution, the second suspending solution including the at least one dissolved polymer at a second concentration. Further, the method can include preparing a composite film from the casting solution, where the composite film includes a dispersion of the exfoliated metal diborides.

In some embodiments, the at least one metal diboride includes at least one of $MgB_2$, $AlB_2$, $TiB_2$, $CrB_2$, $ZrB_2$, $NbB_2$, $HfB_2$, and $TaB_2$. In some embodiments, the dispersion of exfoliated metal diborides includes at least one of single-layer $MgB_2$, $AlB_2$, $TiB_2$, $CrB_2$, $ZrB_2$, $NbB_2$, $HfB_2$, and $TaB_2$. In some further embodiments, the dispersion of exfoliated metal diborides includes mixtures of monolayers, bilayers, trilayers, and quadlayers of at least one of $MgB_2$, $AlB_2$, $TiB_2$, $CrB_2$, $ZrB_2$, $NbB_2$, $HfB_2$, and $TaB_2$. In some further embodiments, the dispersion of exfoliated metal diborides includes $ScB_2$, $VB_2$, $MnB_2$, $FeB_2$, $YB_2$, $MoB_2$, $ReB_2$, $UB_2$, $WB_2$, and $BeB_2$.

In some embodiments of the invention, the first suspending solution is an aqueous solution and the at least one polymer comprises polyvinyl alcohol. In some further embodiments, the concentration is 1 wt % polyvinyl alcohol. In some other embodiments, the second concentration is 5 wt % polyvinyl alcohol. In some embodiments, the first suspending solution is an aqueous solution and the at least one polymer comprises Nafion D-520 polymer. In other embodiments, the first and second concentration is 10 wt % Nafion D-520 polymer.

In some embodiments, the ultrasonic energy is between 11 and 12 Watts. In some further embodiments, the centrifugation speed is between 10 g up and 1,019,000 g. In some embodiments, the centrifugation time is between 15 seconds and 24 hours. In some embodiments, the centrifugation temperature can vary from about 0° C. to 40° C.

In some embodiments, the composite film at least partially transparent. In other embodiments of the invention, the composite film is flexible. In some embodiments, the composite film comprises 4 wt % CrB2 in polyvinyl alcohol. In some further embodiments, the composite film comprises 8 wt % CrB2 in polyvinyl alcohol.

Some embodiments further comprise sonicating the casting solution prior to preparing the composite film. In other embodiments, the ultrasonic energy is applied using a probe ultrasonicator dipped into the mixture.

Some embodiments include a method of producing metal diboride nanomaterials preparing a mixture of at least one metal diboride and a suspending solution that has at least one solvent. The method can include at least partially exfoliating the at least one metal diboride by exposing the mixture to ultrasonic energy comprising ultrasonic vibrations, and centrifuging the mixture and forming at least a lower phase and an adjacent supernatant, where the supernatant includes a dispersion of exfoliated metal diborides. Further, the method can include extracting at least a portion of the dispersion from the supernatant.

In some embodiments, the dispersion of exfoliated metal diborides includes at $MgB_2$, $AlB_2$, $TiB_2$, $CrB_2$, $ZrB_2$, $NbB_2$, $HfB_2$, $TaB_2$, $ScB_2$, $VB_2$, $MnB_2$, $FeB_2$, $YB_2$, $MoB_2$, $ReB_2$, $UB_2$, $WB_2$, and/or $BeB_2$. In some embodiments, the at least one solvent is water and the suspending solution is an aqueous surfactant solution includes sodium cholate, sodium dodecyl sulfate, dodecylbenzene sulfonic acid sodium salt, cationic cetrimonium bromide, myristyltrimethylammonium bromide surfactant, sodium octyl sulfate, sodium tetradecyl sulfate, sodium deoxycholate, sodium taurodeoxycholate, Pluronic F-68, Pluronic P-123, Tetronic 904, and/or Tetronic 1107.

In some embodiments, the at least one solvent is N-methyl-2-pyrrolidone, dimethylformamide, cyclopentanone, cyclohexanone, N-formyl piperidine, vinyl pyrrolidone, 1,3-dimethyl-2-imidazolidinone, bromobenzene, benzonitrile, benzyl benzoate, N,N'-dimethylpropylene urea, γ-butrylactone, N-ethyl-pyrrolidone, dimethylacetamide, cyclohexylpyrrolidone, dimethyl sulfoxide, dibenzyl ether, chloroform, isopropylalcohol, cholobenzene, 1-octyl-2-pyrrolidone, 1-3 dioxolane, ethyl acetate, quinoline, benzaldehyde, ethanolamine, diethyl phthalate, N-Dodecyl-2-pyrrolidone, pyridine, dimethyl phthalate, formamide, ethanol, vinyl acetate, acetone, ethylene glycol, toluene, heptane, hexane, and pentane, or mixtures thereof. In some other embodiments, the suspending solution includes riboflavin, ssDNA, dsDNA, BSA, and a peptide or polypeptide.

DETAILED DESCRIPTION

Figure 1A:
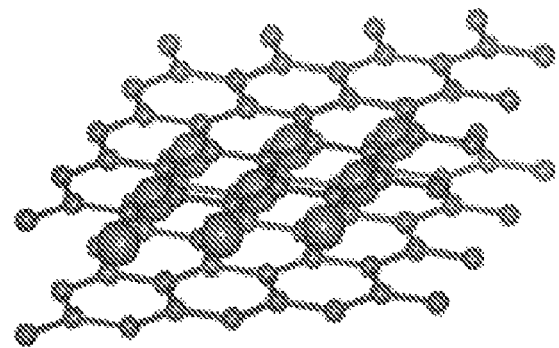
FIG. 1A is a perspective view of a representation of a hexagonal $MB_2$ lattice according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention include methods to prepare stable, high concentration dispersions of pristine atomically thin metal diboride sheets in organic solvents and aqueous solutions. Some embodiments include methods of producing solution phase dispersions of 2d metal diborides in a single step using ultrasonic acoustic cavitation. In some embodiments of the invention, stable solution phase dispersions of $MgB_2$, $AlB_2$, $TiB_2$, $CrB_2$, $ZrB_2$, $NbB_2$, $HfB_2$, and $TaB_2$ of been produced by one or more of the methods described herein. In some further embodiments of the invention, stable, high concentration dispersions of $ScB_2$, $VB_2$, $MnB_2$, $FeB_2$, $YB_2$, $MoB_2$, $ReB_2$, $UB_2$, $WB_2$, and $BeB_2$ can be produced by one or more of the methods as described herein.

In some embodiments, pristine metal diborides can be used as starting materials. Pristine forms can be purchased from commercial vendors in powder form or as crystalline wafers. In some embodiments of the invention, the metal diborides can be used to prepare organic solvent and aqueous solvent dispersions without any additional chemical processing steps. Some embodiments include methods to disperse $MB_2$ materials using a biocompatible dispersion agent.

In some embodiments, $MB_2$ dispersions prepared by the methods described herein can be used to form thin films of pristine $MB_2$. In some embodiments, the $MB_2$ dispersions prepared by the methods described herein can be applied to various articles of manufacture. In some embodiments, 2d metal diboride suspensions prepared by the methods described herein can be used for spray-on superconducting coatings, ultrahigh temperature nanocomposites, fuel cell electrodes, manufacturing equipment coatings, atmospheric reentry vehicles, in low weight/high strength armor, and as a unique class of nanomaterials to exploit for biological applications (e.g. drug delivery, antimicrobial coatings, microbial fuel cell electrodes.)

In some embodiments of the invention, 2d nanosheet dispersions of $MB_2$ can be prepared by adding about 0.4 grams of pristine metal diboride powder along with about 6 mL of solvent or aqueous surfactant solution in a 15 mL plastic centrifuge tube. In some embodiments, the mixture can be sonicated using a probe ultrasonicator (e.g., such as a Branson Digital Sonifer 450D, with a 4 mm diameter tip). Ultrasonication relies on the principle of cavitation to shear apart the sheets, which are then stabilized by the surrounding solvent or surfactant molecules. Some embodiments included sonicating 0.4 g of each bulk metal diboride powder in 6 mL of each solvent or surfactant solution at a suitable power (11-12 W) for one hour. Sonication times, amplitudes, input powers, and the sonicator tip size can be varied to change the concentration and the size (e.g. thickness, area) of the metal diborides dispersed. In some embodiments, the temperature of the mixture can be lowered during sonification using an ice water bath. The sonication can be run at higher temperatures, if necessary. Cooling with an ice water bath or a water bath is used to prevent the solvent from boiling away as power is added to the fluid during sonication.

Figure 1B:
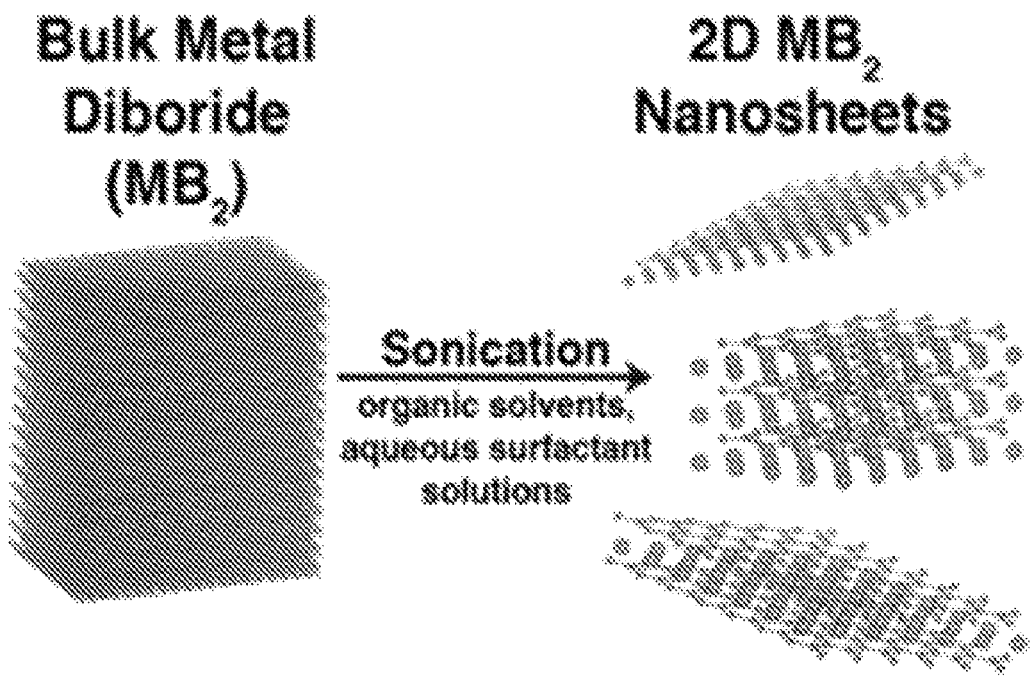
FIG. 1B is representation of a method of forming 2d $MB_2$ from bulk $MB_2$ in accordance with some embodiments of the invention.

In some embodiments, the power applied to the metal diboride particles coupled with a suitable solvent/surfactant can promote separation and subsequent exfoliation of the metal diboride sheets of near atomic thickness (e.g., see FIG. 1B showing a representation of a method of forming 2d $MB_2$ from bulk $MB_2$ in accordance with some embodiments of the invention). In some embodiments, the resulting dispersion was transferred into 1.5 mL tubes and centrifuged at about 5000 g for about 4 minutes (e.g., using an Eppendorf 5424 centrifuge with FA-45-24-11 rotor). Centrifugation times and speeds can be varied to change the concentration and the size (e.g. thickness, area) of the resulting dispersions. Centrifugation speed can be varied from about 10 g up to about 1,019,000 g and the time can range from about 15 seconds to about 24 hours or more. The centrifugation can also be performed in a medium with variations in density so as to change the sedimentation of particles in the centrifuge tube. The centrifugation temperature can vary from about 0° C. to about 40° C.

Figure 1C:
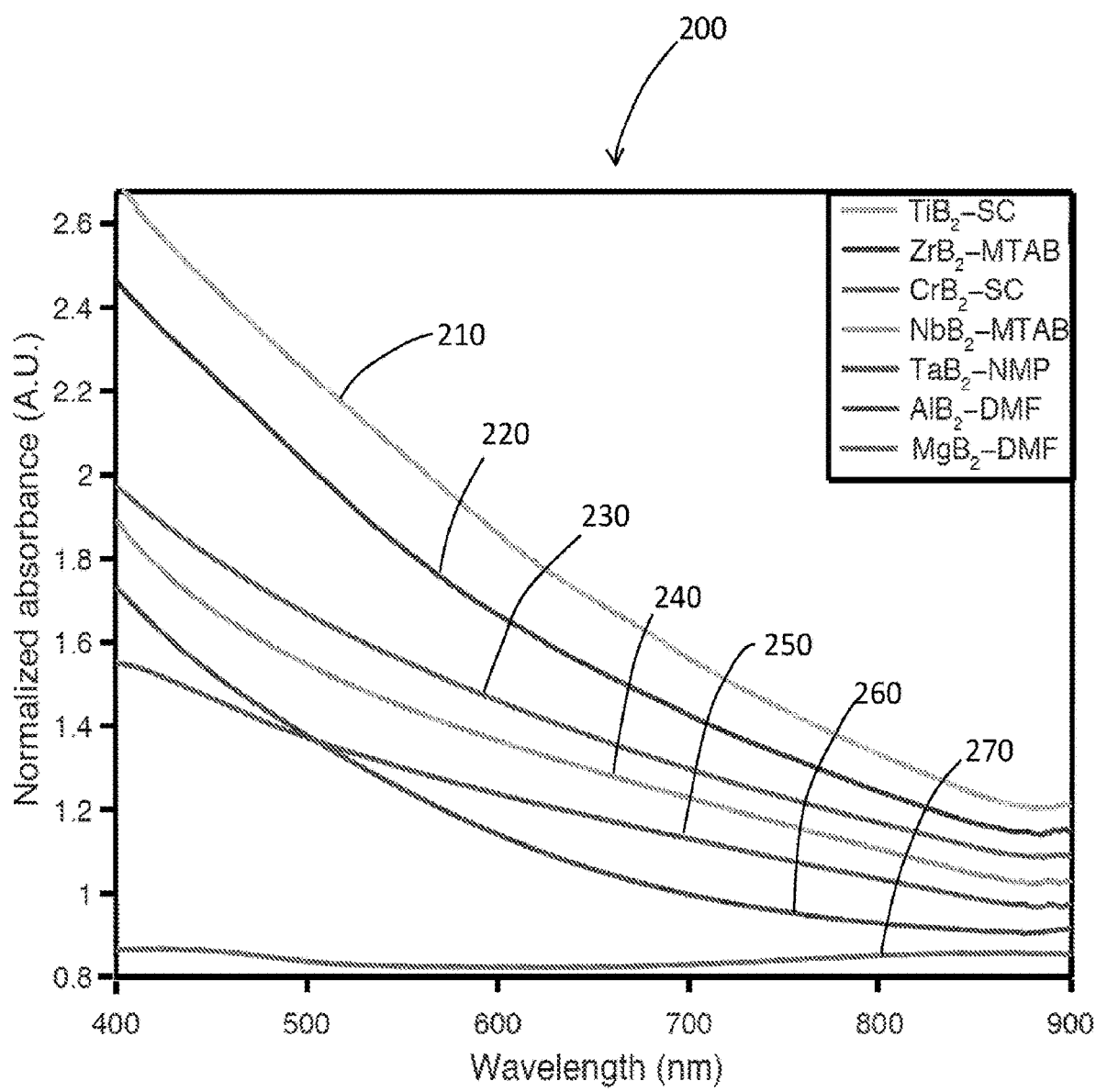
FIG. 1C shows optical absorbance spectra from ultraviolet range through to near infrared wavelengths in accordance with some embodiments of the invention.

In some embodiments, the centrifugation step can serve to sediment the poorly dispersed metal diboride particles and very thick flakes from the dispersion (also described herein as a "lower phase"). Following centrifugation to remove poorly dispersed materials, the supernatant was decanted. This process was applied to eight different metal diborides: magnesium diboride ($MgB_2$), aluminum diboride ($AlB_2$), titanium diboride ($TiB_2$), chromium diboride ($CrB_2$), zirconium diboride ($ZrB_2$), niobium diboride ($NbB_2$), hafnium diboride ($HfB_2$), and tantalum diboride ($TaB_2$). In some embodiments, the top half (also described as an "upper phase") of the solution can contain monolayer to few-layer thick metal diboride nanosheets that can be harvested using a pipette and saved for further characterization. The resulting solution-phase dispersions were grey to dark black depending on the metal boridene and remained in suspension for weeks without precipitating with the exception of $AlB_2$, which precipitates after several days. The optical absorbance spectra obtained from the dispersions are mostly featureless with the exception of $MgB_2$ (data 270) which shows two broad peaks near 400 nm and 850 nm as shown in FIG. 1C, compared to the optical absorbance spectra for $TiB_2$ (line 210), $ZrB_2$ (line 220), $CrB_2$ (line 230), $NbB_2$ (line 240), $TaB_2$ (line 250), and $AlB_2$ (line 260).

In some embodiments of the invention, various organic solvents can be used to disperse the $MB_2$ materials. For example, in some embodiments, (N-methyl-2-pyrrolidone ("NMP"), dimethylformamide ("DMF") and isopropylalcohol ("IPA") can be used. In some other embodiments of the invention, aqueous solvents can be used to disperse the $MB_2$ materials. For example, some embodiments include aqueous anionic sodium cholate ("SC"), sodium dodecyl sulfate ("SDS"), dodecylbenzene sulfonic acid sodium salt ("SDBS"), or cationic cetrimonium bromide ("CTAB"), myristyltrimethylammonium bromide ("MTAB") surfactant solutions to identify those that yielded stable 2d metal diboride dispersions. The combinations of metal diboride and solvent/surfactant that were successful are summarized in Table 1 (shown marked as "Y"). In some embodiments, the surfactants can be used at 1% weight per volume (w/v) concentrations. Dimethylformamide (DMF) was found to be an effective solvent for $MgB_2$ and $AlB_2$, while N-methyl-2-pyrrolidone (NMP) was effective for $HfB_2$ and $TaB_2$. $TiB_2$ and $CrB_2$ were efficiently dispersed in aqueous solution using the anionic surfactant sodium cholate (SC) and $ZrB_2$ and $NbB_2$ were best exfoliated in aqueous solution using the cationic surfactant myristyltrimethylammonium bromide (MTAB).

In some embodiments, using the methods described earlier, $MB_2$ compounds with metals located on the same row of the periodic table generally can be dispersible in the same solvent/surfactant combination. In some further embodiments, the 2d metal diboride sheets can be dispersed using many different solvents, including but not limited to, cyclopentanone ("CPO"), cyclohexanone, N-formyl piperidine ("NFP"), vinyl pyrrolidone ("NVP"), 1,3-dimethyl-2-imidazolidinone ("DMEU"), bromobenzene, benzonitrile, benzyl benzoate, N,N'-dimethylpropylene urea ("DMPU"), γ-butry-lactone ("GBL"), N-ethyl-pyrrolidone ("NEP"), dimethyl-acetamide ("DMA"), cyclohexylpyrrolidone ("CHP"), dimethyl sulfoxide ("DMSO"), dibenzyl ether, chloroform, isopropylalcohol ("IPA"), cholobenzene, 1-octyl-2-pyrrolidone ("N8P"), 1-3 dioxolane, ethyl acetate, quinoline, benzaldehyde, ethanolamine, diethyl phthalate, N-Dodecyl-2-pyrrolidone ("N12P"), pyridine, dimethyl phthalate, formamide, ethanol, vinyl acetate, acetone, ethylene glycol, toluene, heptane, hexane, and pentane. Similarly, many different anionic, non-ionic, and cationic surfactants can be used, including but not limited to, sodium decyl sulfate, sodium octyl sulfate, sodium tetradecyl sulfate, sodium deoxycholate, sodium taurodeoxycholate, Pluronic® F-68, Pluronic® P-123, Tetronic® 904, and Tetronic® 1107. Pluronic and Tetronic are registered trademarks of BASF Corporation, Parsippany, N.J.

Figure 2A:
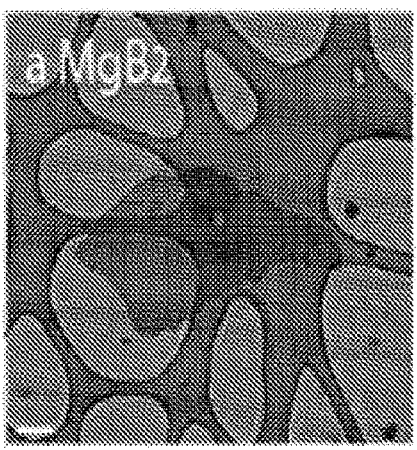
FIGS. 2A-2H illustrate TEM images of the 2d metal diboride nanosheets in accordance with some embodiments of the invention.
Figure 2B:
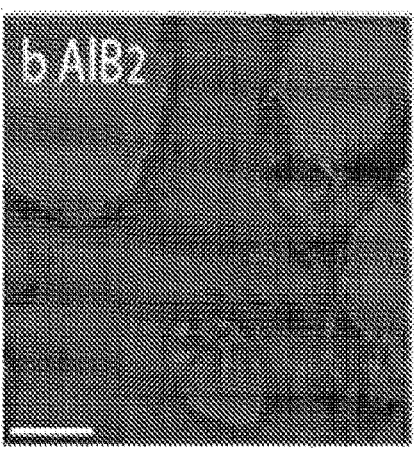
Figure 2C:
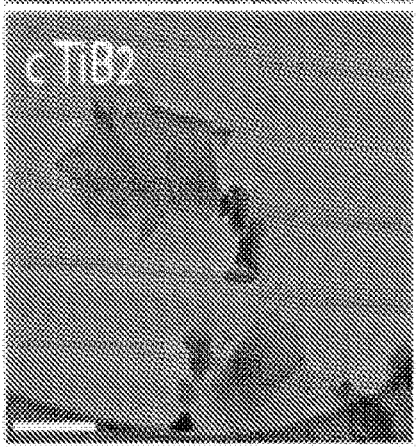
Figure 2D:
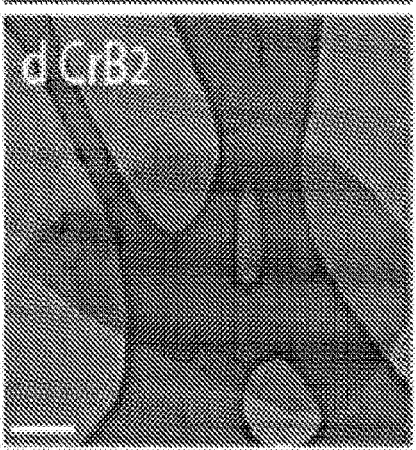
Figure 2E:
Figure 2F:
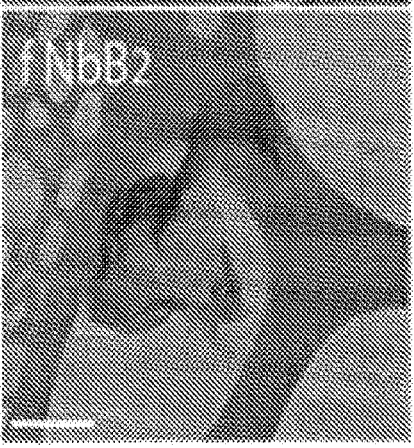
Figure 2G:
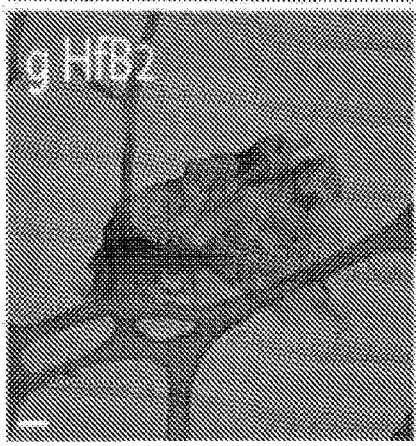
Figure 2H:
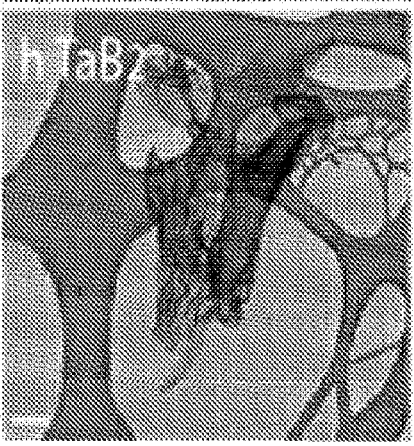

$TiB_2$ (FIG. 2C), and $CrB_2$ (FIG. 2D) to folded and crumpled ones, as shown for $ZrB_2$ (FIG. 2E), $NbB_2$ (FIG. 2F), $HfB_2$ (FIG. 2G), and $TaB_2$ (FIG. 2H). The flake sizes were found to vary, with $AlB_2$ having the smallest flakes and $MgB_2$ displaying the largest flakes.

Figure 3A:
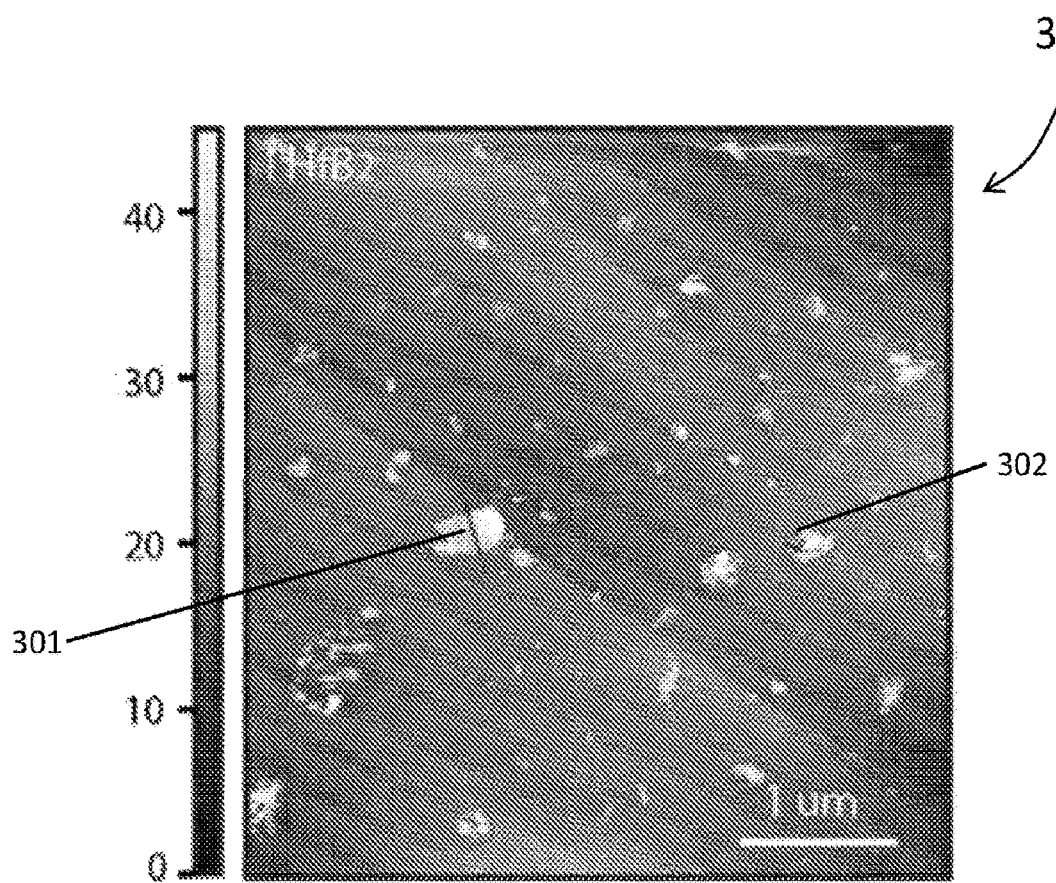
FIG. 3A shows an AFM image of hafnium boridene deposited onto a $SiO_2$/Si wafer in accordance with some embodiments of the invention.
Figure 3B:
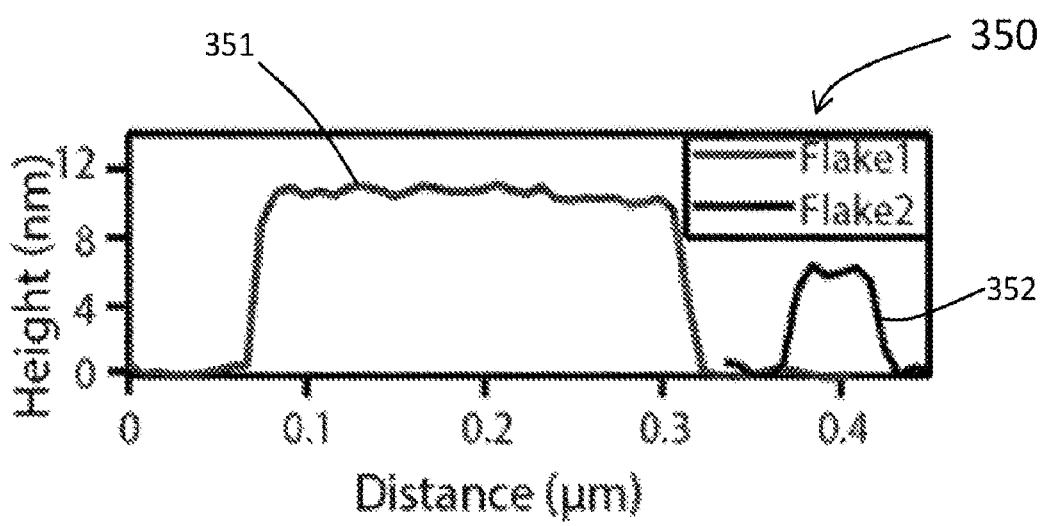
FIG. 3B shows height profiles of two metal boridene nanosheets from the AFM image of FIG. 3A in accordance with some embodiments of the invention.

AFM analysis was performed on nanosheets of $HfB_2$ prepared by the methods described herein and deposited onto a $SiO_2$/Si substrate. FIG. 3A shows an AFM image 300 of hafnium boridene deposited onto a $SiO_2$/Si wafer in accordance with some embodiments of the invention, and shows a sample flake 301 and sample flake 302. FIG. 3B shows height profiles of two metal boridene nanosheets (sample 301 corresponding to scan 351 and sample 302 corresponding to scan 352) from the AFM image of FIG. 3A in accordance with some embodiments of the invention. These measurements reveal the planar structure and thicknesses of 6 nm and 11 nm. Given the interlayer spacing of 0.35 nm for crystalline $HfB_2$, these thicknesses correspond to nanosheets consisting of 10 to 20 boron layers.

Figure 3C:
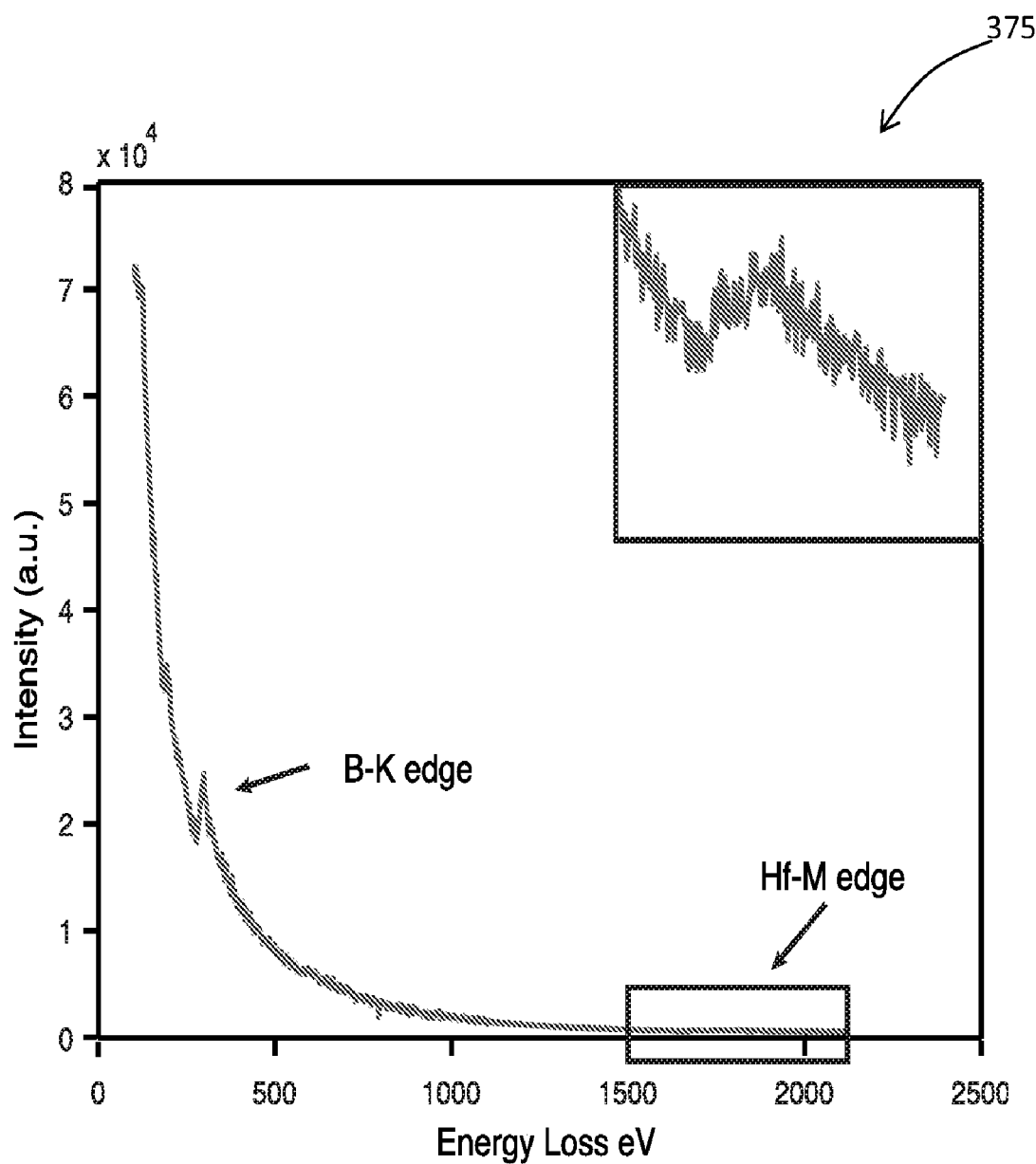
FIG. 3C shows an EELS spectrum containing both B K-edge and Hf M-edge in accordance with some embodiments of the invention.

Electron energy loss spectroscopy (EELS) was used to identify the elemental makeup of the metal boridenes. For example, FIG. 3C shows graph 375 with an EELS spectrum containing both B K-edge and Hf M-edge, and was used to determine the hafnium to boron ratio of about 34:71, which is approximately equal to the expected value of 1:2. In addition, the EELS spectrum does not show evidence of any other atoms being present in the nanosheets, for instance oxygen, thus confirming the pristine nature of the hafnium diboridene.

Figure 4:
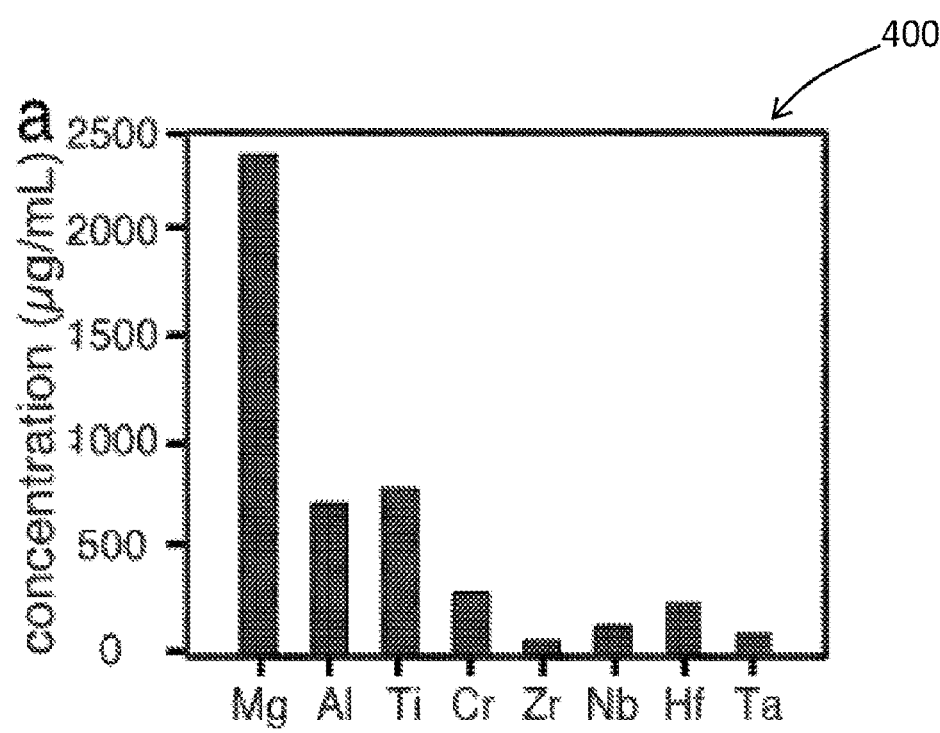
FIG. 4 shows a plot of concentrations of metal boridenes in accordance with some embodiments of the invention.

The concentrations of the metal boridene liquid-phase dispersions were determined using ICP-MS. These measurements showed a broad range of concentrations from a high concentration of 2.4 mg/mL for $MgB_2$ to a low concentration of 0.07 mg/mL for $ZrB_2$ (graph 400 of FIG. 4). Dynamic light scattering (DLS) measurements were taken for all dispersions to assess the size distributions of the metal boridene nanosheets (see graph 450 in FIG. 5). These studies showed that $HfB_2$ possesses the largest flakes with a wide distribution of sizes and modal value of 220 nm, whereas $AlB_2$ and $NbB_2$ have the smallest flakes and a narrower

TABLE 1

Matrix showing successful metal diboride and solvent/surfactant dispersion pairs

| Metal diboride | Valence electrons | CTAB | MTAB | SC | SDS | SDBS | DMF | NMP | IPA |
|---|---|---|---|---|---|---|---|---|---|
| $MgB_2$ | $3s^2$ | N | | N | | | Y | N | |
| $AlB_2$ | $3s^2\ 3p^1$ | N | | N | | | Y | N | |
| $TiB_2$ | $3d^2\ 4s^2$ | N | | Y | Y | Y | N | | Y |
| $CrB_2$ | $3d^5\ 4s^1$ | Y | | Y | Y | Y | N | | Y |
| $ZrB_2$ | $4d^2\ 5s^2$ | Y | Y | N | | | N | | Y |
| $NbB_2$ | $4d^4\ 5s^1$ | N | Y | Y* | | | N | N | |
| $HfB_2$ | $4f^{14}\ 5d^2$ | N | | N | | | N | Y | Y |
| $TaB_2$ | $6s^2$ | N | | N | | | N | Y | |

Referring to the contents of Table 1, "Y" marks combinations that produced successful stable dispersions, "N" marks unsuccessful combinations, "Y*" marks a combination that required 9 hours of sonication for successful dispersion, and blank cells are those combinations that were not tested.

Figure 5:
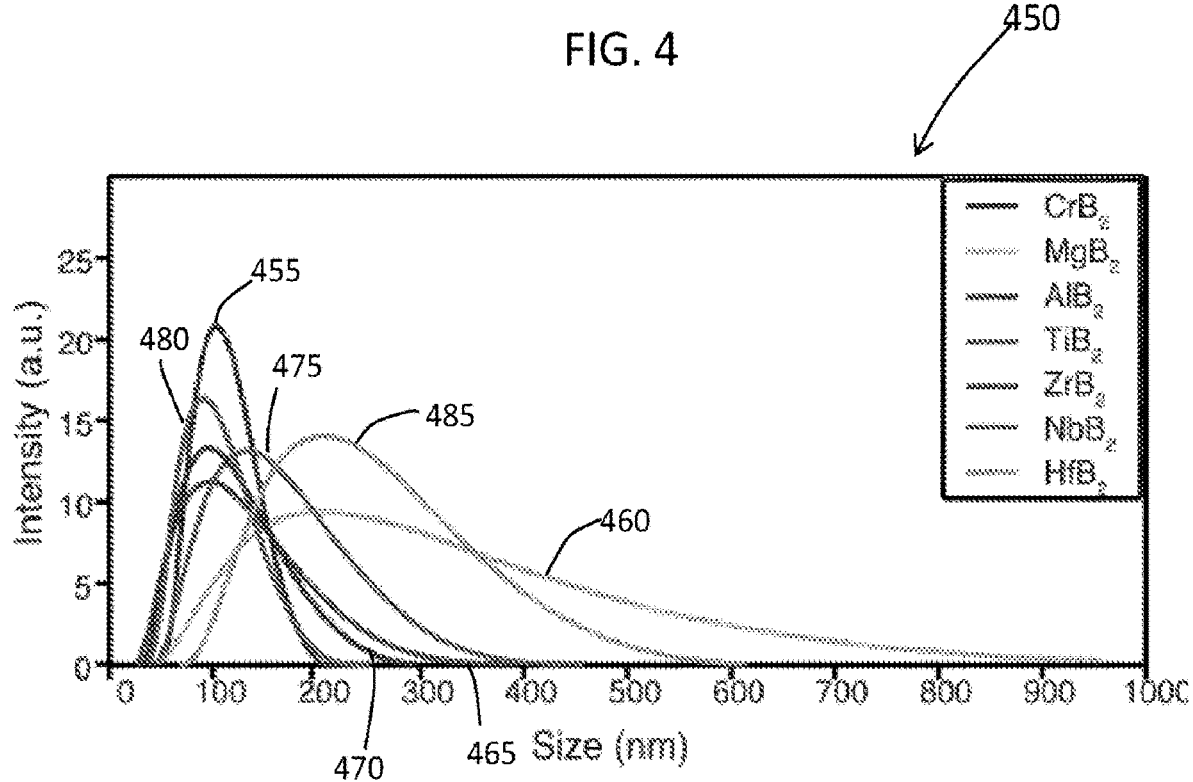
FIG. 5 shows a plot of size distributions of metal boridenes in accordance with some embodiments of the invention.

TEM images of the 2d metal diboride nanosheets revealed monolayer to few layer nanomaterials (e.g., see FIGS. 2A-2H, where the scale bars are 200 nm). The flakes are found in different morphologies varying from flat, planar sheets, as shown for the $MgB_2$ (FIG. 2A), $AlB_2$ (FIG. 2B), distribution with a mode value of almost 90 nm (see FIG. 5 showing $CrB_2$ data line 455, $MgB_2$ data line 460, $AlB_2$ data line 465, $ZrB_2$ data line 470, $TiB_2$ data line 475, $NbB_2$ data line 480, and $HfB_2$ data line 485.

To determine the extinction coefficient of $MgB_2$ and its loading in dispersions, 8.25 g of $MgB_2$ was dispersed in 110 ml of DMF in a 500 ml steel beaker by sonicating at 50% power (49 W) for 2 hours using a 13 mm diameter titanium tip. The top 100 ml of the resulting dispersion was equally divided into four 50 ml centrifuge tubes, and then centrifuged at 4200 rpm for 40 minutes at room temperature using a S-4-72 rotor. The top 18 mL of the dispersion was collected from each tube and the absorbance spectrum was obtained. About 70 mL of the resulting dispersion was flocculated by adding excess methanol and the newly aggregated $MgB_2$ was left to settle for several hours. The flocculated particles were then filtered through a PTFE membrane (pore size 100 nm) and thoroughly rinsed with methanol. The weight of the filter paper before and after filtration was measured to determine the mass of $MgB_2$ in the original 70 mL dispersion. From this procedure, the extinction coefficient of $MgB_2$ at 651 nm was calculated to be 4.002 mL $mg^{-1}$ $cm^{-1}$. The concentration of the $MgB_2$/DMF dispersion was also found to be 0.26 mg $mL^{-1}$, a reasonably high concentration for a solution-phase two-dimensional nanomaterial preparation.

The high surface area and biocompatibility of the two-dimensional metal diborides could enable them to circulate in the body and deliver drugs to cells. The biocompatibility of metal diborides prepared by the methods described herein was examined by measuring the cytotoxicity of $ZrB_2$/BSA dispersions in HeLa cell cultures using a 3-(4,5-dimethyl-thiazol-2-yl)-2,5-diphenyltetrazolium bromide (MTT) assay. A starting $ZrB_2$/BSA suspension was added to a maximum concentration of ~50 μg $mL^{-1}$ and at progressively lower concentrations to cultures over a period of 24 hours. The addition of $ZrB_2$ had no effect on cell viability. The use of nucleic acids as a means of producing stable suspensions of the metal diborides was examined. Metal diborides were dispersed with dsDNA by taking 200 mg of metal diboride powder and mixing it with 5 mL of dsDNA solution (0.4 mg/ml). This mixture was sonicated for 2 hours at 12 W power using a 4 mm diameter tip. The resulting dispersion was centrifuged at 5000 g for 5 minutes and the supernatant harvested for characterization. This procedure was used for six metal diborides ($ZrB_2$, $HfB_2$, $NbB_2$, $CrB_2$, $TaB_2$, $TiB_2$) and found that all six yielded stable dispersions with dsDNA. We investigated the ability of dsDNA-dispersed $CrB_2$ and $ZrB_2$ to adsorb the common chemotherapy drug doxorubicin (DOX). 0.1 mL of the dsDNA metal diboride sample was mixed with various concentrations of DOX (typically 10 to 50 μg mL-1) in water. This mixture was then shaken at 800 rpm and 37° C. for 24 hours (the shaking speed, temperature, and duration of this reaction can be varied). After nanomaterial/DOX loading, the sample was centrifuged at 21,000 g for 5 minutes to pellet the DOX/metal diboride conjugate. After removal of the supernatant, the pellet was re-suspended in water. This centrifugation and re-suspension procedure was repeated multiple times to remove excess DOX from the solution. Finally, the sample was dispersed in water and sonicated in a bath for two to three minutes to re-disperse any aggregates that had formed during the procedure. Optical absorbance spectroscopy was used to characterize the resulting DOX-loaded metal diboride samples. Control absorbance spectra were taken of the dsDNA/metal diboride and the DOX alone and were used to determine the concentrations of both in the drug-loaded samples. This analysis indicated that $CrB_2$/dsDNA was capable of loading up to 39 μg $mL^{-1}$, while ZrB2/dsDNA could load up to 35 μg $mL^{-1}$.

ssDNA was examined as a dispersion agent for $ZrB_2$. In these experiments, 200 mg of $ZrB_2$ powder was mixed with 5 ml of ssDNA solution (0.2 mg $mL^{-1}$) and the sample was sonicated for 2 hours at 20 W power using a 4 mm diameter tip. The solution was centrifuged at 5000 g for 5 minutes and the supernatant decanted for optical studies. The results showed that the amount of $ZrB_2$ that could be dispersed using ssDNA depended strongly on the sequence of DNA used. ssDNA with 20 consecutive adenine bases (A20) and 20 consecutive cytosines (C20) yielded the lowest dispersion efficiencies; while T20 (20 thymines) and (GGGGT)4, where G is guanine, provided the highest concentrations for the single (or nearly single) nucleotide ssDNAs. Using (GT)10 and (GT)20, which have identical base compositions but different lengths, showed that the 40-nt ssDNA dispersed ~50% more $ZrB_2$ than the 20-nt ssDNA.

Metal diborides functionalized with dsDNA can be used to deliver dsDNA into the cells for use with DNA vaccines and for DNA transfection. Metal diborides functionalized with ssDNA have uses for biological imaging (for instance if ssDNA is conjugated to a fluorophore) and can be used to deliver ssDNA into the cell, for example for gene knock-down via a delivered antisense oligonucleotide. The results using DNA as a dispersion agent suggests that ssRNA and dsRNA will also likely be compatible. Metal diboride/RNA conjugates could be employed for siRNA delivery and for RNA vaccines. Furthermore, ssDNA and ssRNA can be used as nanoscale "glues" to bind metal diborides to other nucleic-acid-functionalized nanomaterials, such as DNA origami, carbon nanotubes, gold nanoparticles, and other metal diborides. A variety of chemically modified nucleic acids can also be used as dispersion agents for the metal diborides.

Some further embodiments include the use of riboflavin for metal diboride dispersion. The metal diboride $ZrB_2$ was dispersed the fluorescent, low molecular weight biomolecule riboflavin. 400 mg of $ZrB_2$ was mixed with 5 mL riboflavin aqueous solution (5 mg $mL^{-1}$), and the sample was sonicated for 2 hours at 12 W power using a 4 mm diameter tip. The solution was centrifuged at 5000 g for 5 minutes and the supernatant decanted. An initial yellow/orange riboflavin solution gained a much darker color upon dispersion of the $ZrB_2$. Following removal of the excess riboflavin from the dispersion, the $ZrB_2$/riboflavin was exposed to UV light and fluorescence was measured. $ZrB_2$/riboflavin conjugates prepared using the above methods retained the green fluorescence of the riboflavin, demonstrating that the $ZrB_2$ does not strongly quench the fluorescence of adsorbed molecules, which supports bioimaging applications for metal diboride dispersions.

Some embodiments include the integration of the exfoliated 2D nanoflakes into macroscopic polymer composites. For example, solution-phase dispersion of metal diborides enables facile incorporation of these two-dimensional materials into composite materials with tunable properties. These composite materials can take advantage of the enhanced thermal stability, chemical stability, and hardness of the metal diborides to improve their properties. Some embodiments include a polymer composite containing $CrB_2$ as a filler material. For example, 400 mg of $CrB_2$ was dispersed in 6 mL of 10% solution of Nafion D-520 in water (the overall Nafion concentration being 0.5%) by sonicating at 20% power (14 W) for 1 hour using a 4 mm diameter tip. The resulting dispersion was centrifuged at 5000 g for 4 minutes to remove the larger particles. 3 mL of the above dispersion was mixed with 5 mL of Nafion D-520 and then poured into a dish and dried overnight in an oven at 60° C. The resulting film was flexible and semitransparent.

Some further embodiments include the dispersion of metal boridenes in 1% aqueous polyvinyl alcohol (PVA) solution via ultrasonication to yield $CrB_2$ suspensions with the high concentrations and stability. For example, to synthesize composites with PVA, 1.3 g of chromium diboride was sonicated in 20 mL of 1% aqueous PVA solution for 1 hour at 30% amplitude and the resulting suspension was distributed equally in 1.5 mL tubes and centrifuged at 5000 rcf for 5 minutes. The above dispersion was mixed with 5% aqueous PVA by vortexing to obtain the required concentrations and then it was bath sonicated for 20 minutes. Then 24 mL of the above dispersion was poured in a petri dish and dried in an oven at 60° C. for 48 hours. The resulting membranes were peeled from the petri dishes, cut into rectangular pieces (3 cm×1 cm) and their thicknesses were measured. Then these were tested mechanically using a tensile tester at a strain rate of 0.05 mm/s. At least three strips were measured for each concentration. The ratio of $CrB_2$—PVA dispersion and the pure PVA solution was varied to obtain composites with different mass fractions of $CrB_2$ and the mechanical strength was of multiple polymer membranes was measured. The polymer composites remained quite flexible with the addition of $CrB_2$ at 4% and 8% mass loadings. For example, see graph 500 of FIG. 6 showing stress-strain curves of 8% $CrB_2$—PVA (data line 505), 4% $CrB_2$—PVA (data line 510), and PVA-only (data line 515) composites in accordance with some embodiments of the invention, and Table 2 showing the ultimate tensile strength (UTS), elastic modulus, and the strain at UTS of the $CrB_2$—PVA and PVA-only polymer membranes.

|  | PVA Only | 4% $CrB_2$ in PVA | 8% $CrB_2$ in PVA |
| --- | --- | --- | --- |
| UTS (MPa) | 50 +/− 8 | 93 +/− 17 | 83 +/− 13 |
| E (GPa) | 0.7 +/− 0.1 | 1.1 +/− 0.5 | 1.1 +/− 0.3 |
| Strain at UTS (%) | 10 +/− 1 | 10 +/− 2 | 10 +/− 2 |

Table 2 showing the ultimate tensile strength (UTS), elastic modulus, and the strain at UTS of the $CrB_2$-PVA and PVA-only polymer membranes.

Figure 6:
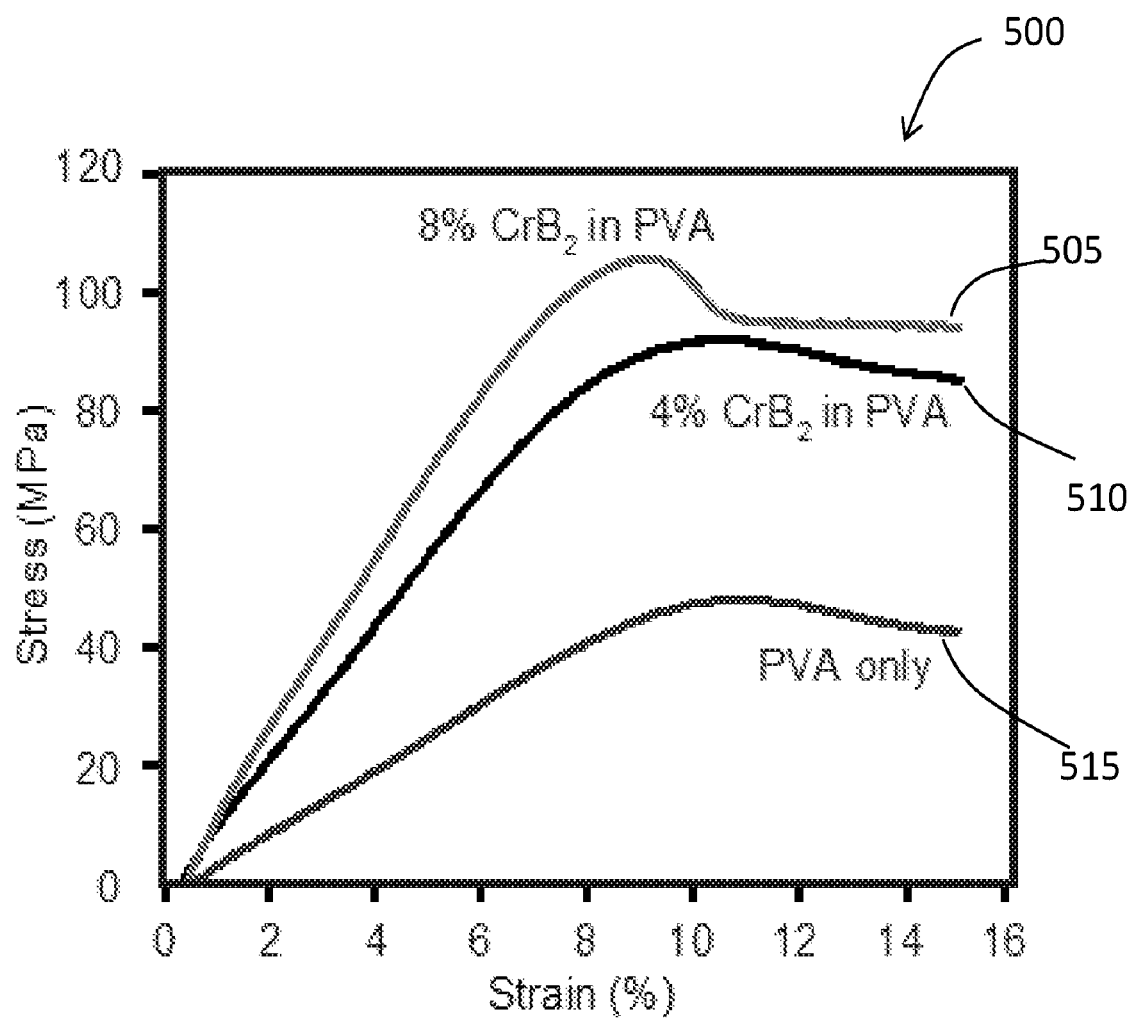
FIG. 6 shows stress-strain curves of 8% $CrB_2$—PVA, 4% $CrB_2$—PVA, and PVA-only composites in accordance with some embodiments of the invention.

In reference to FIG. 6 and Table 2, $CrB_2$—PVA composites showed an 87% increase in the ultimate tensile strength (UTS), and a 57% increase in the elastic modulus (E) with the introduction of 8% $CrB_2$. The strength of the composite increased when the chromium boridene loading was increased from 4% to 8%; however, the UTS dropped drastically when the concentration was increased to 16% and the membrane also became very brittle. Remarkably, the mechanical strength of PVA increased when combined with as-exfoliated $CrB_2$, whereas previously reported 2D materials had required an additional size sorting step to observe any improvement in the mechanical properties making this a very convenient, cheap and scalable method for producing stronger plastics.

Figure 7A:
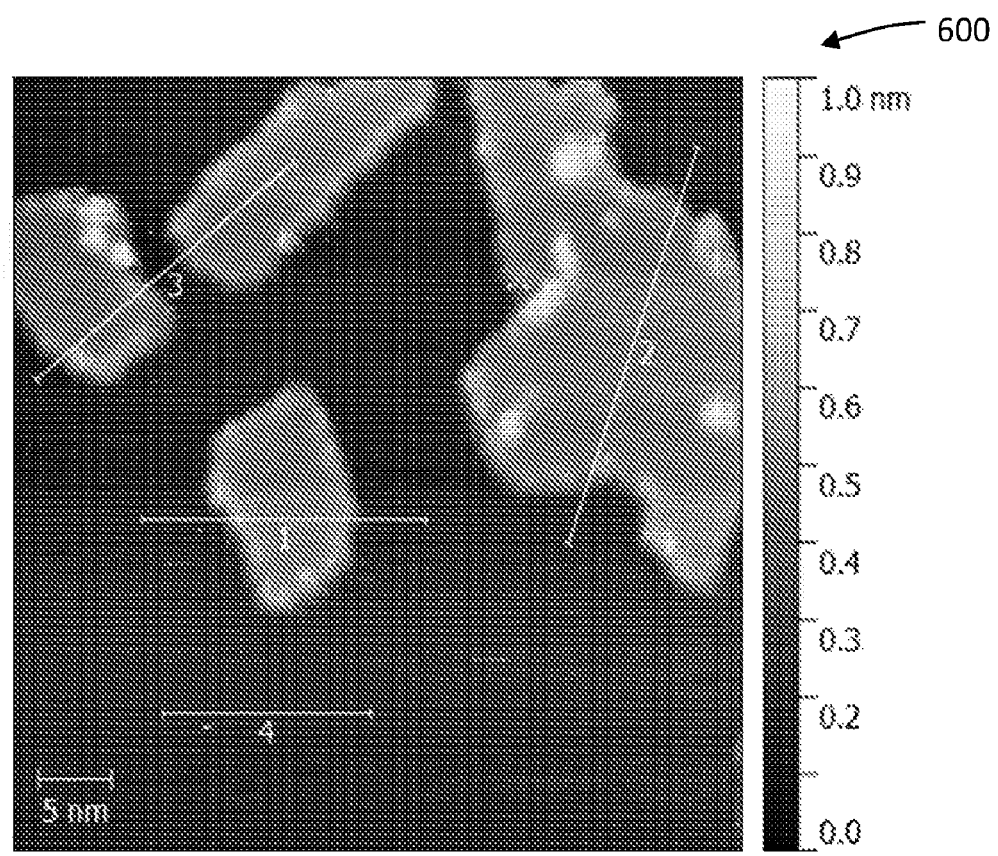
FIG. 7A shows a scanning tunneling microscope image of zirconium boridene deposited from isopropylalcohol onto a highly ordered pyrolytic graphite substrate in accordance with some embodiments of the invention.
Figure 7B:
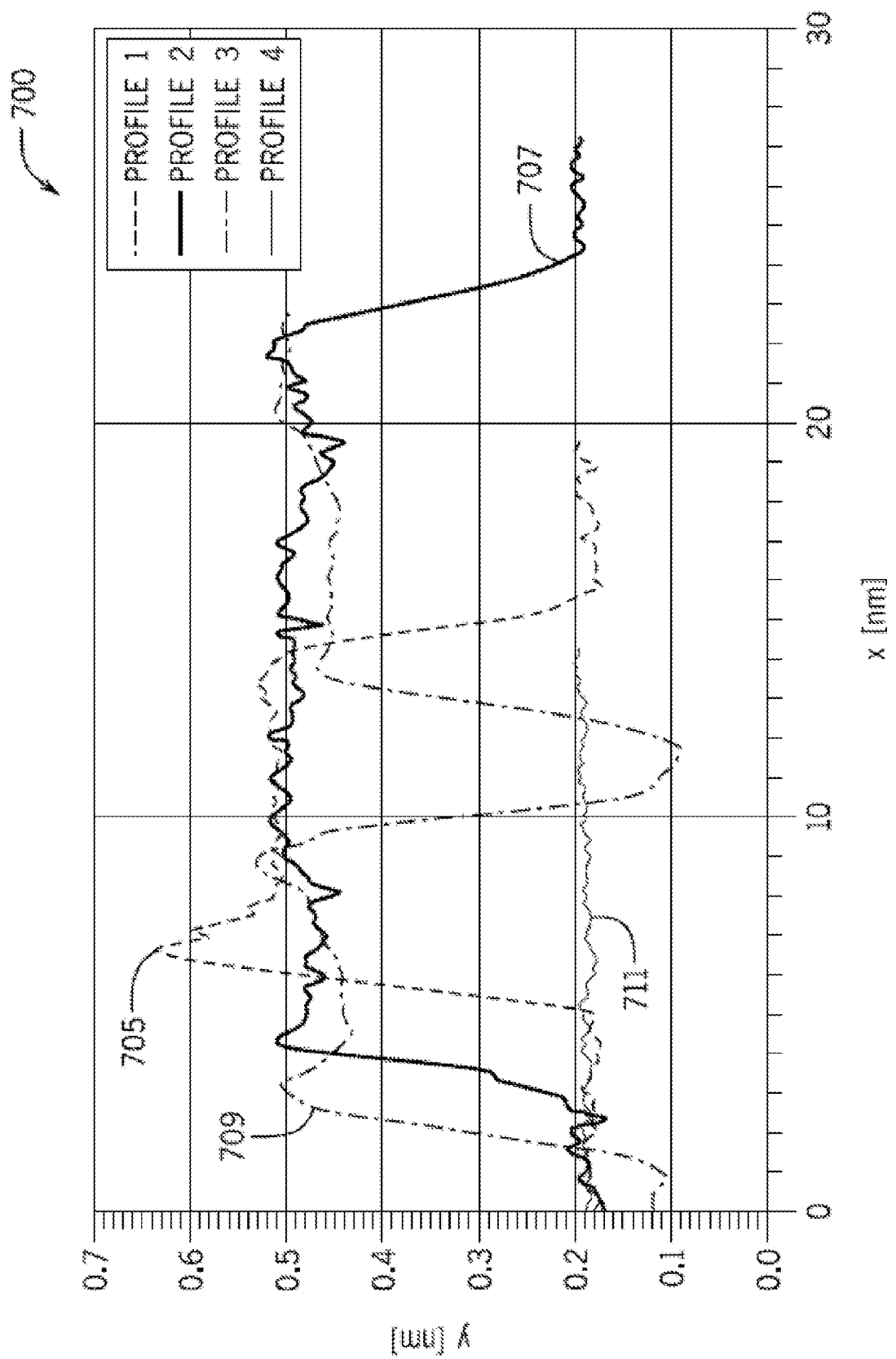
FIG. 7B shows height profiles of the zirconium boridene nanosheets from the AFM image of FIG. 7A in accordance with some embodiments of the invention.

Scanning tunneling microscope (STM) analysis was performed on nanosheets of $ZrB_2$ prepared in the solvent IPA by the methods described herein and deposited onto a highly ordered pyrolytic graphite (HOPG) substrate using spin-coating. FIG. 7A shows a scanning tunneling microscope image 600 of the zirconium boridene deposited from isopropylalcohol onto a highly ordered pyrolytic graphite substrate in accordance with some embodiments of the invention, and FIG. 7B shows height profiles 700 of the zirconium boridene nanosheets from the AFM image of FIG. 7A in accordance with some embodiments of the invention. FIG. 7A shows four line profiles were taken at the numbered locations (1, 2, 3, 4, where 4 is a baseline scan of the graphite). The line profiles are shown in the right image in FIG. 7B (where line 1 is shown as 705, line 2 profile is shown as 707, line 3 profile is shown as 709, and line 4 profile is shown as 711). The line profiles that run over the flakes in image 600 (1, 2, and 3) all display step heights of 0.35 nm and reveal the flat surface of the zirconium boridene 2d sheet. The observed step heights correspond to the interlayer spacing of 0.35 nm of crystalline $ZrB_2$. The STM image thus directly confirms the production of monolayer metal boridene sheets by the methods described herein.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of producing metal diboride nanomaterials comprising:
preparing a mixture of at least one metal diboride and a suspending solution, the suspending solution including at least one solvent;
at least partially exfoliating the at least one metal diboride by exposing the mixture to ultrasonic energy comprising ultrasonic vibrations;
centrifuging the mixture and forming at least a lower phase and an adjacent supernatant, the supernatant including a dispersion of exfoliated metal diborides; and
extracting at least a portion of the dispersion from the supernatant;
wherein the at least one solvent is selected from N-methyl-2-pyrrolidone, dimethylformamide, cyclopentanone, cyclohexanone, N-formyl piperidine, vinyl pyrrolidone, 1,3-dimethyl-2-imidazolidinone, bromobenzene, benzonitrile, benzyl benzoate, N,N'-dimethylpropylene urea, y-butrylactone, N-ethylpyrrolidone, dimethylacetamide, cyclohexylpyrrolidone, dimethyl sulfoxide, dibenzyl ether, chloroform, isopropylalcohol, cholobenzene, 1-octyl-2-pyrrolidone, 1-3 dioxolane, ethyl acetate, quinoline, benzaldehyde, ethanolamine, diethyl phthalate, NDodecyl-2-pyrrolidone, pyridine, dimethyl phthalate, formamide, ethanol, vinyl acetate, acetone, ethylene glycol, toluene, heptane, hexane, and pentane.

2. The method of claim 1, wherein the dispersion of exfoliated metal diborides includes at least one of $MgB_2$, $AlB_2$, $TiB_2$, $CrB_2$, $ZrB_2$, $NbB_2$, $HfB_2$, $TaB_2$, $ScB_2$, $VB_2$, $MnB_2$, $FeB_2$, $YB_2$, $MoB_2$, $ReB_2$, $UB_2$, $WB_2$, and $BeB_2$.

3. The method of claim 1, wherein the at least one solvent is water and the suspending solution is an aqueous surfactant solution including at least one of sodium cholate, sodium dodecyl sulfate, dodecylbenzene sulfonic acid sodium salt, cationic cetrimonium bromide, myristyltrimethylammonium bromide surfactant, sodium octyl sulfate, sodium tetradecyl sulfate, sodium deoxycholate, sodium taurodeoxycholate, polyoxyethylene-polyoxypropylene block copolymer, poly(ethylene glycol)-block-poly(propylene glycol)-block-poly(ethylene glycol), ethylenediamine tetrakis(ethoxylate-block-propoxylate) tetrol and ethylenediamine tetrakis(propoxylate-block-ethoxylate) tetrol.

4. The method of claim 1, wherein the suspending solution includes riboflavin, ssDNA, dsDNA, BSA, and a peptide or polypeptide.

* * * * *